(12) United States Patent
Müllner

(10) Patent No.: US 6,637,916 B2
(45) Date of Patent: Oct. 28, 2003

(54) LAMP FOR VEHICLES

(76) Inventor: Hermann-Frank Müllner, Lyngsbergstr. 3a, D-53177 Bonn (DE)

(*) Notice: Subject to any disclaimer, the term of this patent is extended or adjusted under 35 U.S.C. 154(b) by 0 days.

(21) Appl. No.: 09/972,021

(22) Filed: Oct. 5, 2001

(65) Prior Publication Data

US 2002/0067615 A1 Jun. 6, 2002

(30) Foreign Application Priority Data

Nov. 26, 2000 (DE) .......................... 100 66 067

(51) Int. Cl.[7] .............................. B60Q 7/00; F21L 4/08; H01R 33/00
(52) U.S. Cl. .................... 362/486; 362/183; 362/84; 362/226; 362/20
(58) Field of Search ................... 362/183, 186, 362/84, 196, 235, 260, 362, 486, 540, 543–545, 20, 226

(56) References Cited

U.S. PATENT DOCUMENTS

| 5,253,150 | A | * | 10/1993 | Vanni | 362/183 |
| 5,362,267 | A | * | 11/1994 | Forrest | 362/362 |
| 5,839,816 | A | * | 11/1998 | Varga et al. | 362/183 |
| 6,109,770 | A | * | 8/2000 | Choimet et al. | 362/543 |
| 6,126,303 | A | * | 10/2000 | Gross | 362/545 |
| 6,179,431 | B1 | * | 1/2001 | Chien | 362/84 |

* cited by examiner

Primary Examiner—Alan Cariaso
(74) Attorney, Agent, or Firm—Gudrun E. Huckett

(57) ABSTRACT

The invention relates to a lamp for vehicles which is integrated in the surface of a vehicle part and which is removable. The lamp is switched on and off via a radio signal and/or a light beam of an infrared diode received by a sensor. The fluorescent plastic material of the lamp body, the solar cell, the sensor, the storage elements and the LED (OLED and/or PLED) form a unit of the lamp and this unit can be mounted and removed a such.

13 Claims, 3 Drawing Sheets

LAMP FOR VEHICLES

BACKGROUND OF THE INVENTION

1. Field of the Invention

The invention refers to a lamp for vehicles, which is integrated in the surface of a vehicle part, which is removable and which is designed with at least one solar module, one energy storage, an illumination device as well as a plug connection in order to supply a consumer with stored energy and/or to feed the energy storage of the vehicle.

2. Description of the Relevant Prior Art

DE 198 55 258 C1 and DE 100 42 100 A1 refer to lamps (flashlights) which are designed with at least one collector, solar module, energy storage, illuminating body and one plug connection arranged in a frame as one unit, which can be removed from a sun visor of a vehicle in order to be utilized outside the vehicle.

SUMMARY OF THE INVENTION

It is an object of the invention to further develop such a lamp, which in addition to being supplied with energy from solar modules, should be useable with a wireless remote control, for switching it on and off, or used as remote control itself.

To solve this object, a sensor device is installed within the lamp and/or external thereto which is remote-controlled in order to trigger a switching process. Further advantageous developments are described in the following.

DESCRIPTION OF THE PREFERRED EMBODIMENTS

Figure 1:
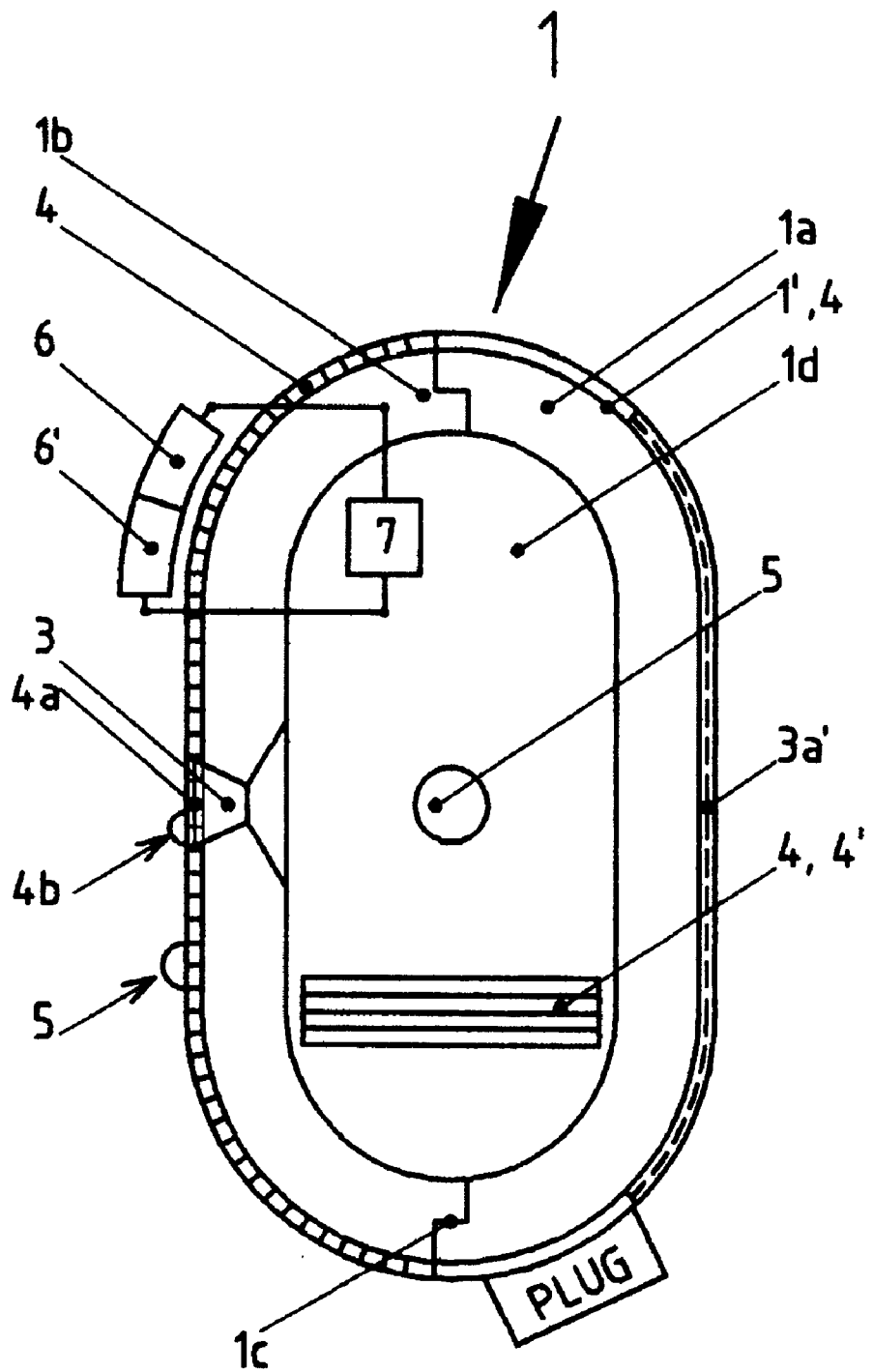
FIG. 1 shows a sectional view of a lamp body with a thin-film solar module layer attached peripherally.
Figure 2:
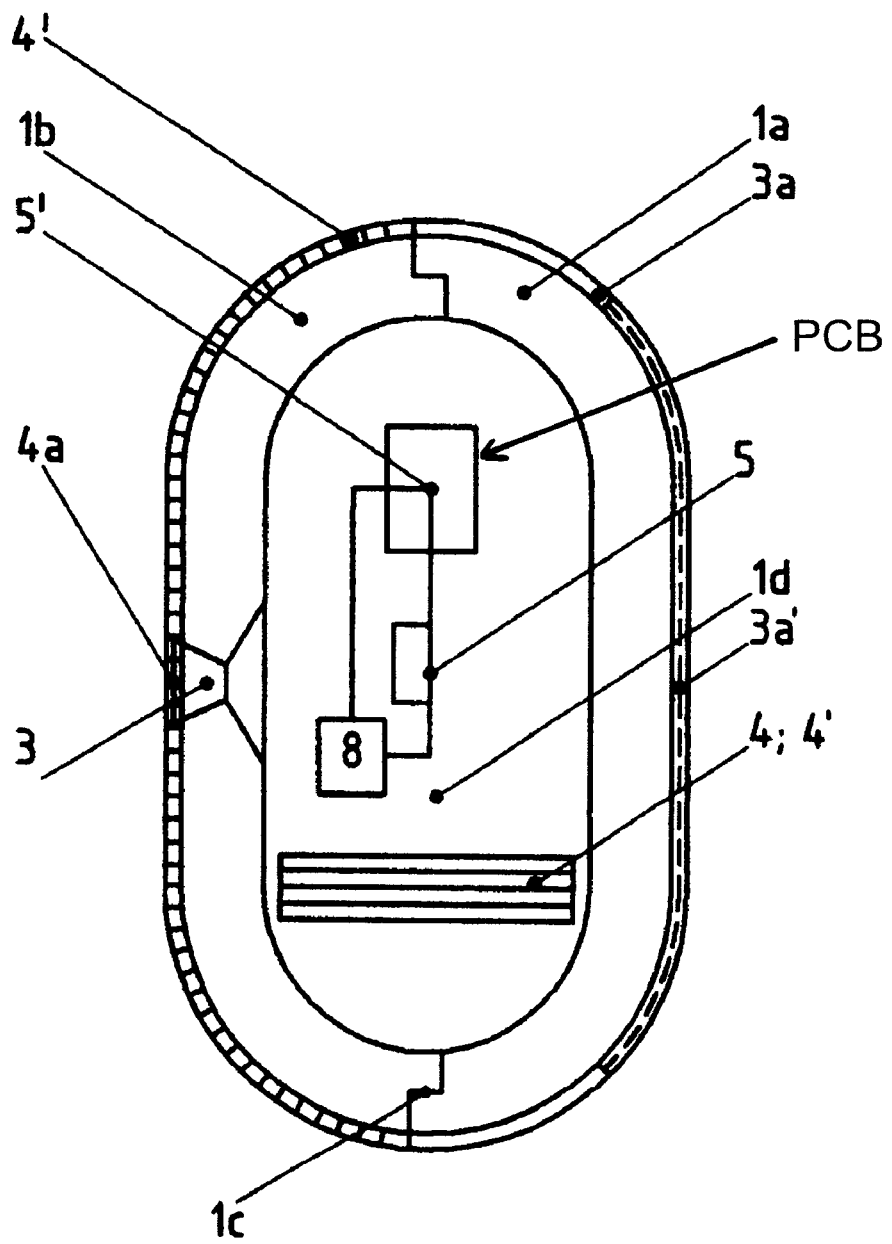
FIG. 2 shows a sectional view of a lamp body with lamellar solar cells attached peripherally.

The lamp installed in a sun shield, or installed at the vehicle ceiling or at the back of the vehicle seats can be of an oval type. However, a box type form or a symmetric or non-symmetric form is possible also as well as a concave or convex embodiment. The lamp body 1 consists of a fluorescent material which can be blow-molded. In this way, a production of the system "lamp" in a flat form is possible. However, other types of production especially considering the location of utilization or considering the requirement of being able to easily exchange the lamp parts within the lamp body 1 are possible. The separation of a lamp body 1 in two parts 1a, 1a can be provided. They are connectable with another to form a unit by means of a ring-shaped spring lock 1c, e.g. via a localized spring lock with a respectively arranged film hinge. This makes it possible—aside from a reflecting aluminum layer 1d-to further arrange replaceable solar cells 4 to be illuminated and at least one illumination device (of a light saving design) 5.

The lamp body 1 can be equipped with a light-transmitting coating 3a on its visible exterior or periphery 1', which protects the lamp body from damages and contamination, on the one hand, while the coating can be colored to match the color of the surroundings, on the other hand. The light transmittance will be ensured by selecting a respective material or by providing openings such a holes or slots 3a'.

Since the entire lamp body 1 preferably consist of luminesce material as a light collector, solar cells 4,4' can be provided on the periphery of the lamp body as well as in its interior. The arrangement of the solar cells as a layer 4 or lamellas 4' depends on the provision of a reflecting aluminum layer 1d in the interior of the lamp body 1 and the type of light transfer, known in the art, from the lamp body 1 onto each individual solar cell 4, 4'. The utilization of translucent solar cells 4,4' appears favorable since, in this way, the light is able to reach adjacent solar cells thereby increasing their energy generation.

To arrange the solar cells 4—especially the thin-film solar cells—as a layer on the periphery of the lamp body 1, a polyimide (capton) foil (not shown) can be used onto which flexible solar cells 4 are welded, soldered or glued. LEDs can be applied on the polyimide foil, especially thin, flexible and lamellar type organic LEDs (OLEDs) and/or polymeric LEDs (PLEDs) as an illumination device 5 as a circuit diagram as well in the interior of the lamp body 1, for instance, around its notch 3 in order to increase the illumination power of the (flashlight) light. A sensor device in the form of a capton-sensor 6 embodied as a thin-film can also be applied. Other suitable sensors are, for instance, capacitive, optoelectronic, piezoelectronic, inductive and infrared sensors. The sensors are designed by known semiconductor technology, e.g. on the basis of silicon or gallium-arsenic.

The installation of solar cells 4' of lamellar type perpendicular on the periphery 1' of the lamp body 1 as well as in its interior as a glass cover in a construction known in the art, result in a best possible transmission of the luminescence light onto these solar cells with respective energy generation. However, it also results in an increased constructional expenditure so that the cost/benefit factor compared with, for instance, a usage of several simple lamps with solar cells fixed onto the surface of the lamp body according to the invention could play a decisive roll.

The lamp body 1 shows—for instance on a side opposite the side on which the light impinges from the exterior—a notch 3. The notch enables the light—which is enhanced by the aluminum foil 1d—to emerge from the interior of the lamp body 1. This notch 3 can be closed, if necessary, with a translucent and/or slidable or hinged solar cell 4a.

The lamp according to the invention is provided with a sensor device having at least one sensor 6 (indicated in FIG. 3) for reception and one sensor 6' for transmission of signals. The sensors are placed within the lamp body 1 or externally on the lamp body 1—in general so as to be visible. For encoding and/or decoding of radio waves or rays (e.g., infrared rays) which impinge upon the sensor 6, at least one chip 7 is installed in the lamp body 1. In this way, the sensor 6 of the lamp can be used, for instance, not only for wireless on and off switching of the lamp but can also be used as a sender 6' for turning on the brake light via an installed transmitter sensor 6 when actuating the brake pedal. The low energy consuming sensors 6 and 6' as well as chips 7 can be operated by the energy of the energy storage 8 of the lamp supplied by the energy generated by the solar cells 4, 4'. The energy storage 8 is preferably in the form of a thin-film power condenser (see U.S. Pat. No. 6,104,597), and takes up little space.

When the inventive lamps are installed, for instance, in vehicle door handles, they can be activated via a RF-radio signal or optically by an infrared signal via the ignition key by means of a reception sensor 6 and can thus illuminate the area in front the door. With such an arrangement, no wiring is necessary anymore for switching on the lamp in the vehicle when opening the vehicle door. This wireless door contact could also correspond with an electronic car key or even with the heat radiation of a person; however, this would be a questionable solution in regard to safety consideration and enablement of theft.

By installing a printed circuit board with an auxiliary circuit in the lamp body 1 and an auxiliary illumination body 5', especially an organic light-emitting diode (OLED) and/or a polymeric light-emitting diode (PLED), at least one auxiliary illumination body 5' can be switched on automatically in case of failure of the diode(s) of the illumination device 5 which is installed in or on the lamp body.

Depending on the vehicle type—passenger car, truck and the like, train, boat, airplane etc.—lamps are required in various sizes and emitted light intensity (lux). For this reason the luminous intensity of a "flashlight" is often insufficient. In general, it is possible to bundle the energy generated in the solar cells 4,4' and the batteries, e.g. power condensers 8, for supplying one or more larger lamps with the assistance of plug connections 9 installed at the lamp bodies 1 and, if necessary, supplement it with energy from the vehicle battery. Additional energy may come from at least one lamellar membrane fuel cell 12 with the assistance of hydrogen cartridges 10 as shown in the circuit diagram according to FIG. 3.

Figure 3:
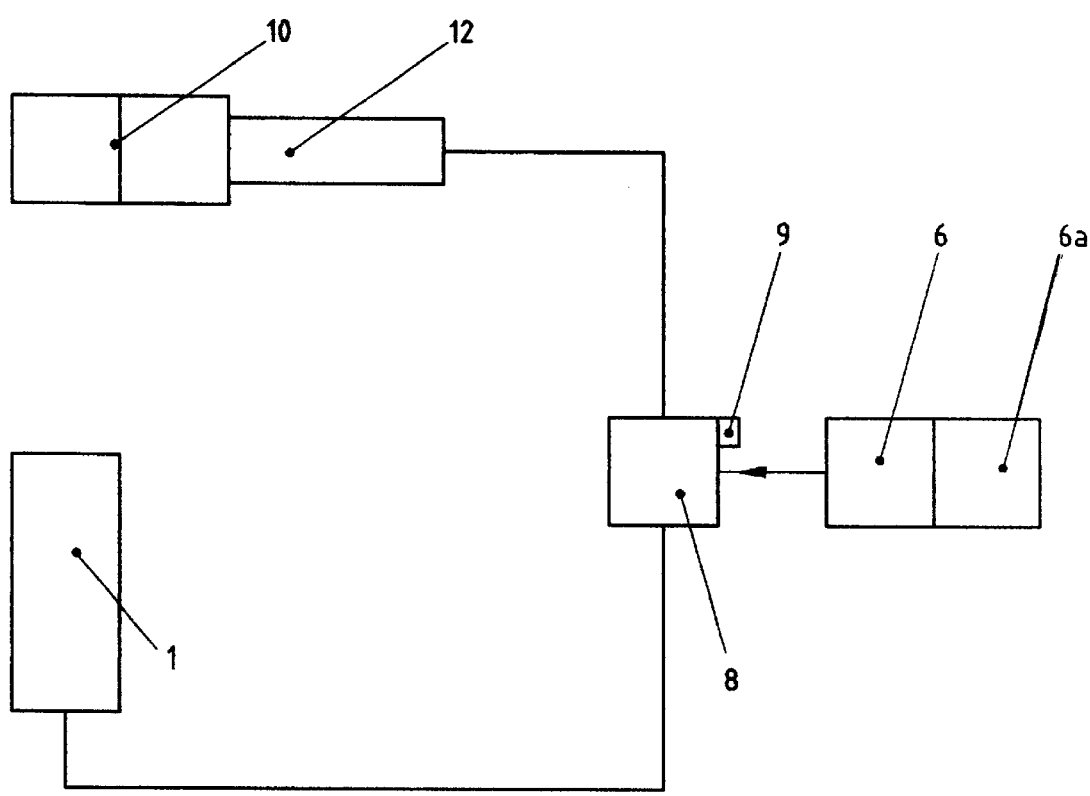
FIG. 3 is a schematic diagram of a lamp with energy supplement via a fuel cell.

In the circuit diagram of FIG. 3 a "piezo-sensor" 6a is shown which controls the operation of light-emitting diodes 5,5' and, in the case of one diode 5 failing, switches on a near-by auxiliary diode 5' automatically. This is important especially when the installation of a display (not shown) comprised of OLED foil and/or PLED foil is provided at the lamp.

While specific embodiments of the invention have been shown and described in detail to illustrate the inventive principles, it will be understood that the invention may be embodied otherwise without departing from such principles.

What is claimed is:

1. A lamp for vehicles which lamp is integrated in a surface of a vehicle part and removable, the lamp comprising:
    a lamp body having an interior and an exterior;
    at least one solar module configured to generate energy and arranged in the interior and/or on the exterior of the lamp body;
    an energy storage device configured to store energy generated by the at least one solar module;
    an illumination device arranged in the interior and/or on the exterior of the lamp body;
    a plug connection provided on the lamp body and configured to transmit energy generated by the solar module to at least one of a consumer and an energy storage of the vehicle;
    at least one remote-control activated sensor device connected to the lamp body and configured to trigger switching of the lamp;
    wherein the lamp body is made of fluorescent material and made by blow molding;
    wherein the lamp body has a notch allowing light emitted by the illumination device to exit from the interior;
    wherein the at least one solar module comprises a light transmissive solar cell configured to alternately cover and expose the notch.

2. A lamp according to claim 1, wherein the lamp body, the at least one solar module, the energy storage device, the illumination device and the plug connection form a detachable unit.

3. A lamp according to claim 1, wherein the lamp body is comprised of two parts fixedly connected to one another.

4. A lamp according to claim 1, wherein the solar cell is configured to be slidable or pivotable.

5. A lamp according to claim 1, wherein the lamp body has a light-transmissive layer arranged on a visible portion of the exterior.

6. A lamp according to claim 1, further comprising at least one chip connected to the lamp body and wherein the at least one chip is configured to provide communication with remote control device.

7. A lamp according to claim 1, wherein the at least one remote-control activated sensor device comprises receiving and emitting sensors configured to provide communication with a remote control device.

8. A lamp according to claim 7, wherein the sensors (6,6',6a) are thin-film sensors.

9. A lamp according to claim 1, wherein the at least one solar module is a flexible thin-film foil fitted in the lamp body.

10. A lamp according to claim 9, wherein the thin-film foil is a metal foil.

11. A lamp according to claim 1, wherein the energy storage device (8) is a thin-film battery in the form of a micro-miniature battery.

12. A lamp according to claim 11, wherein the thin film battery is a thin-film power condenser.

13. A lamp for vehicles which lamp is integrated in a surface of a vehicle part and removable, the lamp comprising:
    a lamp body having an Interior and an exterior;
    at least one solar module configured to generate energy and arranged in the interior and/or on the exterior of the lamp body;
    an energy storage device configured to store energy generated by the at least one solar module;
    an illumination device arranged in the interior and/or on the exterior of the lamp body;
    a plug connection provided on the lamp body and configured to transmit energy generated by the solar module to at least one of a consumer and en energy storage of the vehicle;
    at least one remote-control activated sensor device connected to the lamp body and configured to trigger switching of the lamp;
    wherein the illumination device comprises one or more diodes selected form the group consisting of a flexible organic diode (OLED) and a polymer diode (PLED);
    a printed circuit board with an auxiliary circuit having an auxiliary illumination body taking over illlumination when the illumination device fails.

* * * * *